United States Patent Office 3,535,287
Patented Oct. 20, 1970

3,535,287
POLYURETHANES BASED ON THREE-COM-
PONENT POLYESTER OLIGOMERS
John Wynstra, Somerville, N.J., assignor to Union
Carbide Corporation, a corporation of New York
No Drawing. Original application June 3, 1965, Ser. No.
461,175. Divided and this application June 19, 1968,
Ser. No. 738,078
Int. Cl. C08g 22/08, 22/16, 22/12
U.S. Cl. 260—75                                      9 Claims

ABSTRACT OF THE DISCLOSURE

Curable, hydroxyl terminated polyester oligomers have been prepared by the interaction of an ester diol, a polyol selected from the group consisting of 1,1,1-trimethylol propane and pentaerythritol and an ester forming compound such as a diaryl carbonate, phosgene or a cyclic dibasic acid or acid anhydride.

This is a division of application Ser. No. 461,175, filed June 3, 1965, now U.S. Pat. No. 3,449,467. These oligomers are cured with polyisocyanate curing agents.

This invention relates to hydroxyl terminated polyester oligomers and particularly to those which are curable to hardened coating compositions.

There is a continuing need for curable resins to be used in compositions which after application to a substrate and curing thereon provide weather-resistant surface coatings. In order to resist discoloration upon aging such resins when cured should be transparent to ultraviolet light. The cured resins should also be tough, flexible and exhibit high impact strength. Since coating resins are conventionally applied in a solvent system the uncured resin should remain soluble in the coating solvent and not crystallize out of solution.

Such a resin has been prepared which is a curable, hydroxyl terminated polyester oligomer obtained by the interaction of:

(a) A diol having the general formula:

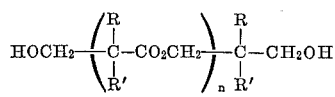

wherein each of R and R' is an alkyl group having up to 10 carbon atoms and $n$ has a value of 0 to 1;

(b) a polyol selected from the group consisting of 1,1,1-trimethylol propane and pentaerythritol; and (c) an ester forming compound selected from the group consisting of diaryl carbonates, phosgene, and a cyclic dibasic acid or anhydride thereof.

Examples of alkyl groups which can represent R or R' is the diol having the formula

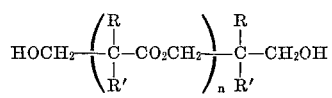

wherein R, R' and $n$ are as defined above, include: methyl, ethyl, n-propyl, isopropyl, n-butyl, isobutyl, t-butyl, and the like. In one preferred embodiment R and R' are methyl and $n=0$ in which case the diol is neopentyl glycol. In another preferred embodiment R and R' are both methyl and $n=1$ in which case the diol is an "ester-diol." This "ester-diol" can be prepared according to methods described in U.S. 2,811,562 and U.S. 3,057,911.

The polyols used in this invention, 1,1,1-trimethylol propane or pentaerythritol are commercially available.

The preferred diaryl carbonate is diphenyl carbonate although substituted diphenyl and dinaphthyl carbonates can be used if desired.

The cyclic dibasic acids or anhydrides which can be used include aromatic diacids or dianhydrides such as phthalic anhydride, isophthalic acid and the like as well as their halogen or alkyl substituted derivatives and cycloaliphatic dianhydrides such as $\Delta^4$-tetrahydrophthalic anhydride, hexahydrophthalic anhydride, chlorendic anhydride and the like.

The hydroxyl terminated polyester oligomers are prepared by a condensation polymerization process which affords a very complex mixture of oligomers having different hydroxyl contents, hydroxyl functionalities, molecular weights, and branch contents with the average values of those parameters determined by the molar ratio of reactants. One preferred oligomer arises when 1,1,1-trimethylol propane, neopentylglycol and diphenyl carbonate are interacted in a charge molar ratio of 2/7.7/9. It is believed that such an oligomer has a hydroxyl functionality of 4.9, a molecular weight of about 1900, and about 12.8 of:

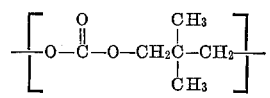

repeating units.

Hydroxyl functionality is defined for the purposes of this invention as the number of hydroxyl groups per molecule. Obviously, many other combinations of molar ratios can be used and these also afford oligomers useful for coating resins. However, a definite formula cannot be ascribed to these oligomers because their exact structure cannot be ascertained. Analytical techniques reveal some of their physical constants and functional groups and so permit stoichiometry calculations for determining amounts of curing agents to employ in curing formulations but this is not a revelation of molecular architecture or structure.

Other preferred oligomers arise from the interaction of 1,1,1-trimethylol propane, "ester-diol," and diphenyl carbonate in mole ratios of about 2/3.7–4.4/5–5.7. Other mole ratios can be used if desired.

Still other preferred oligomers include those obtained by the interaction of 1,1,1-trimethylol propane, "ester-diol" or neopentyl glycol and a dianhydride such as phthalic, isophthalic, tetrahydrophthalic or hexahydrophthalic anhydride in a mole ratio of about 2/2.7–3.7/4–6. Other ratios including substitution of pentaerythritol for 1,1,1-trimethylol propane can also be used.

Conventional reactors and vacuum distillation equipment can be used for the preparation of the oligomers. In those condensations where a diaryl carbonate is the ester-forming reactant, phenol is a byproduct and its removal is best effected with a fractionating column having at least 10 theoretical plates. Where a dianhydride is the ester-forming reactant a Dean-Stark trap or Weir box facilitates removing the water in azeotropic distillation.

The temperature range preferred for the preparation of the oligomers is about 175 to 200° C. although a range of about 150 to 250° C. can also be used if desired.

Pressure is not narrowly critical but sub-atmospheric pressures of about 20 to 150 mm. are preferred, in preparations utilizing a diaryl carbonate as the ester-forming reactant. Atmospheric pressure esterifications can be used with the dianhydride reactants.

Time of reaction is not narrowly critical for the oligomer preparation but for efficiency and economical yields at least 2 hours should be used. The upper limit is determined by the kinetics of the particular condensation and the degree of conversion desired but is not critical.

The curable hydroxyl terminated polyester oligomers of the invention can be cured or hardened with crosslinking agents such as the polymethyl ethers of polymethylol melamines and polyisocyanates.

Hexamethoxymethylmelamine is the preferred polymethylolmelamine in this invention although others can be used. Hexamethoxymethylmelamine is readily soluble in water, low molecular weight alcohols, and phenols, sparingly soluble in low molecular weight ketones, esters, nitromethane and similar polar solvents. It is substantially insoluble in hydrocarbons, halogenated hydrocarbons and silimar nonpolar solvents. Solvents such as aromatic hydrocarbons, however, readily dissolve the combination of hydroxy-terminated oligomer and hexamethoxymethylmelamine. Hexamethoxymethylmelamine can be represented by the formula:

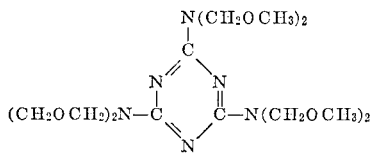

It is preferred to employ an acid catalyst with the hexamethoxymethylmelamine crosslinking agent such as p-toluene sulfonic acid, phosphoric acid, a sulfonic acid or the like.

The polymethyl ethers of polymethylol melamines are well known in the art as are methods for preparing them. Reference is made to U.S. 3,065,109 which discloses their preparation. Polymethylol melamines can be prepared by reacting one mol of melamine with at least two mols of formaldehyde. A fully methylolated melamine, such as hexamethylolmelamine, can be prepared by reacting at least six mols of formaldehyde with one mole of melamine. In order to obtain the desired methyl ether, the polymethylol melamines thus produced are reacted with the requisite amount of methylol under conditions of mineral acid catalysis. Thus, for example, reacting two mols of methanol with one mol of a dimethylolmelamine results in the formation of the dimethyl ether of dimethylolmelamine. Higher methylolmelamines can be reacted with from two to six mols of methanol as determined by the number of available methylol groups and the degree of etherification desired. Foh example, starting with tetramethylolmelamine, it is possible to prepare the dimethyl ether and the tetramethyl ether. It is also possible to produce, as a further illustration, a trimethyl and pentamethyl ether of hexamethylol melamine. Upon complete etherification of hexamethylolmelamine, the hexamethyl ether or hexamethoxymethylmelamine is produced.

The polyisocyanates used in this invention are organic polyisocyanates containing two or more isocyanate groups. These organic polyisocyanates can be alkyl, cycloalkyl, aryl, aralkyl or alkaryl polyisocyanates. It is preferred to use diisocyanates although triisocyanates or higher polyisocyanates can also be used, if desired. Preferred isocyanates include bis(2-isocyanatoethyl)carbonate (CDI),
bis(2-isocyanatoethyl)-4-cylohexene-1,2-dicarboxylate (CEDI),
bis(2-isocyanatoethyl)fumarate (FDI),
bis(2-isocyanatoethyl)-1,4,5,6,7,7-hexachloro-5-norbornene-2,3-dicarboxylate (HEDI),
methylene bis(4-phenyl isocyanate) (MDI),
bis(2-isocyanatoethyl)-5-norbornene-2,3-dicarboxylate (NEDI) and
2,4-tolylenediisocyanate (TDI).

As examples of other suitable polyisocyanates which are employed herein can be mentioned
1,2-diisocyanatoethane,
1,3-diisocyanatopropane,
1,2-diisocyanatopropane,
1,4-diisocyanatobutane,
1,5-diisocyanatopentane,
1,6-diisocyanatohexane,
bis(3-isocyanatopropyl)ether,
bis(3-isocyanatopropyl)sulfide,
1,7-diisocyanatoheptane,
1,5-diisocyanato-2,2-dimethylpentane,
1,6-diisocyanato-3-methoxyhexane,
1,8-diisocyanatooctane,
1,5-diisocyanato-2,2,4-trimethylpentane,
1,9-diisocyanatononane,
1,10-diisocyanatodecane,
1,6-diisocyanato-3-butoxyhexane, the bis(3-isocyanatopropyl)ether of
1,4-butyleneglycol,
1,11-diisocyanatoundecane,
1,12-diisocyanatododecane,
bis(isocyanatohexyl)sulfide,
1,4-diisocyanatobenzene,
2,4-diisocyanato-1-chlorobenzene,
2,4-diisocyanato-1-nitrobenzene,
2,5-diisocyanato-1-nitrobenzene,
3,6-diisocyanato-1,4-dichlorobenzene,
2,5-diisocyanato-1-chloro-4-methoxybenzene,
2,5-diisocyanato-1-methoxybenzene,
2,4-diisocyanato-1-methoxybenzene,
2,5-diisocyanato-1-methyl-4-methoxybenzene,
2,4-diisocyanato-1-ethylbenzene,
2,4-diisocyanato-1-ethoxybenzene,
4,6-diisocyanato-1,3-dimethoxybenzene,
2,5-diisocyanato-1,4-dimethoxybenzene,
2,4-diisocyanato-1-propylbenzene,
2,5-diisocyanato-1-propylbenzene,
2,4-diisocyanato-1-isobutylbenzene,
2,4-diisocyanato-1-isobutoxybenzene,
2,5-diisocyanato-1,4-diethoxybenzene,
1,3-diisocyanatocyclohexane,
1,4-diisocyanatocyclohexane,
1,4-diisocyanatonaphthalene,
1,5-diisocyanatonaphthalene,
2,6-diisocyanatonaphthalene,
2,7-diisocyanatonaphthalene,
1-(isocyanatomethyl)-2-(3-isocyanatopropyl)-3,5-dimethylcyclohexane,
1,3-bis(4-isocyanatophenyl)-propane,
α,β-bis(2-isocyanatoethyl)-9,10-endoethylene dihydroanthracene,
2,4-diisocyanato-1-methylcyclohexane,
2,4-diisocyanato-1-ethylcyclohexane,
bis(4-isocyanatocyclohexyl)methane,
1,1-bis(4-isocyanatocyclohexyl)ethane,
2,2-bis(4-isocyanatocyclohexyl)-propane,
bis(2-methyl-4-isocyanatohexyl)methane,
bis(3,5-dimethyl-4-isocyanatohexyl)methane,
1-isocyanatomethyl-4-isocyanatobenzene,
1-(2-isocyanatoethyl)-4-isocyanatobenzene, 1-(2-isocyanatoethyl)-3-isocyanatobenzene,
1-(3-isocyanatopropyl)-4-isocyanatobenzene,
1-(4-isocyanatobutyl)-4-isocyanatobenzene,
1,5-diisocyanatotetrahydronaphthalene,
4,4'-diisocyanatoazobenzene,
2-methyl-4,4'-diisocyanatoazobenzene,
4,4'-diisocyanato-1-naphthaleneazeobenzene,
2,4-diisocyanatodiphenylether,
dianisidene diisocyanate,
ethylene glycol bis(4-isocyanatophenyl)ether,
diethylene glycol bis(4-isocyanatophenyl)ether,
2,2'-diisocyanatobiphenyl,
2,4-diisocyanatobiphenyl,
4,4-diisocyanatobiphenyl,
3,3'-dimethoxy-4,4'-diisocyanatobiphenyl,
3,3'-dimethyl-4,4'-diisocyanatobiphenyl,
3,3'-dimethyl-4,4'-diisocyanatobiphenyl,
2-nitro-4,4'-diisocyanatobiphenyl,
bis(4-isocyanatophenyl)methane,
bis(2-methyl-4-isocyanatophenyl)methane,
2,2-bis(4-isocyanatophenyl)propane,
bis(2,5-dimethyl-4-isocyanatophenyl)methane,
cyclohexyl-bis(4-isocyanatophenyl)methane,
bis(3-methoxy-4-isocyanatophenyl)methane,
bis(4-methoxy-3-isocyanatophenyl)methane,
bis(2-methyl-5-methoxy-4-isocyanatophenyl)methane,
2,2-bis(3-chloro-4-isocyanatophenyl)propane,
2,2'-diisocyanatobenzophenone,
2,4-diisocyanatodibenzyl,
p-nitrophenyl-bis(4-isocyanatophenyl)methane,
phenyl-bis(2,5-dimethyl-4-isocyanatophenyl)methane,
2,7-diisocyanatofluorene,
2,6-diisocyanatophenanthroquinone,
3,6-diisocyanato-9-ethylcarbazole,
3,8-diisocyanatopyrene,
2,8-diisocyanatochrysene,
2,4-diisocyanatodiphenylsulfide,
bis(4-isocyanatophenyl)sulfide,
bis(4-isocyanatophenyl)sulfone,
bis(4-isocyanatobenzyl)sulfone,
2,4'-diisocyanato-4-methyldiphenylsulfone,
4-methyl-3-isocyanatobenzylsulfonyl-4'-isocyanatophenyl ester,
4-methoxy-3-isocyanatobenzylsulfonyl-4'-isocyanatophenyl ester,
bis(2-methyl-4-isocyanatophenyl)disulfide,
bis(3-methyl-4-isocyanatophenyl)disulfide,
bis(4-methyl-3-isocyanatophenyl)disulfide,
bis(4-methoxy-3-isocyanatophenyl)disulfide,
bis(3-methoxy-4-isocyanatophenyl)disulfide,
4-methyl-3-isocyanatobenzylsulfonyl-4-isocyanato-3-methylanilide,
N,N'-bis(4-isocyanatobenzylsulfonyl)-1,2-diamonoethane,
bis(3-methoxy-4-isocyanatobenzyl)sulfone,
1,2-bis(4-methoxy-3-isocyanatobenzylsulfonyl)ethane,
N,N'-bis(4-methoxy-3-isocyanatobenzyl)-1,2-diamonoethane,
2,4,6-triisocyanatotoluene,,
triisocyanatomesitylene,
1,3,7-triisocyanatonaphthalene,
2,4,4'-triisocyanatodiphenylmethane,
bis(2,5-diisocyanato-4-methylphenyl)-methane,
tris(4-isocyanatophenyl)methane,
N,N'-bis(4-isocyanatophenyl)carbamyl acid chloride and the like.

The invention is further described by the examples which follow in which all parts and percentages are by weight unless otherwise specified.

EXAMPLE 1

Preparation of oligomer from trimethylol propane, neopentyl glycol and diphenyl garbonate A 5-liter, 4-necked round-bottom flask equipped with a magnetic stirrer, a thermometer, nitrogen inlet tube, manometer, fractionating column and vacuum pump was charged with 268 g. (2 moles) of 1,1,1-trimethylol propane, 833 g. (8 moles) of neopentyl glycol, 1928 g. (9 moles) of diphenyl carbonate, and 0.016 g. of LiOH·H$_2$O. The fractionating column, constructed of glass and vacuum-jacketed, contained a section 30 inches long and 1.5 inches in diameter packed with 316 stainless steel saddles, 0.16 x 0.16 inch having holes punched in them. The column head was of the total reflux-total take-off type, the reflux ratio being controlled with an automatic timer. The pressure at the head was maintained constant by means of a manostat.

The charged flask was then evacuated and filled with dry nitrogen 5 times. The batch temperature was raised to 150° C. by means of an electric heating mantle at which temperature the head pressure was adjusted with the vacuum pump and manostat to 100 mm. of mercury. Phenol was collected at a reflux ratio of 4/1. In 11.25 hours 1671 g. of phenol was collected (98.6% of the theoretical value). Vapor phase chromatographic analysis indicated a phenol purity of 99.6%. The oligomer product removed from the flask amounting to 1283 g. was a very pale, (Gardner color less than 1) low melting amorphous solid which analyzed 2.56 milliequivalents of hydroxyl per gram, molecular weight of about 1900 and a hydroxyl functionality (number of hydroxyls per molecule) of 4.9. The column hold-up was 70 g. and was shown by vapor phase chromatographic analysis to be 68% neopentyl glycol and 32% phenol. The structure of this hydroxyl terminated oligomer is not definitely known but is presumed to have such units as:

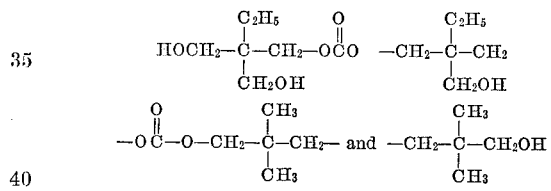

with the penultimate member of this list predominating since the apparent nominal reaction stoichiometry is 2/8/9 trimethylol propane/neopentyl glycol/diphenyl carbonate and the condensation process is essentially carried to completion. If the neopentyl glycol lost in the column hold-up is taken into account then this stoichiometry would be 2/7.7/9 trimethylol propane/neopentyl glycol/diphenyl carbonate.

The oligomer product is soluble in toluene but not readily soluble in aliphatic alcohols although a toluene-butanol mixture can be used as a diluent. The oligomer solutions showed no tendency to crystallize out of solution.

EXAMPLE 2

Hexamethoxymethylmelamine cured oligomer

The hydroxyl terminated oligomer obtained in Example 1 was dissolved in toluene (75% solids) and then blended with hexamethoxymethylmelamine, toluene and p-toluenesulfonic acid catalyst to provide toluene solutions at 65% solids. All of these solutions were clear, pale in color (less than 1 on the Gardner color scale) and low viscosity (about 50 centipoises). Films were cast from these solutions with a 4 mil doctor blade on glass and on bonderized steel followed by baking at 150° C. for 45 minutes. The impact strength of the films which cured on the bonderized steel was measured and recorded in Table 1.

The Gardner Impact Strength Test indicates the ability of a coating on a coated metal panel to withstand an impact from an impinging ball without cracking or peeling on the convex side of the indentation which results from the impact.

The 80/20 and 60/40 coatings on glass were stripped off and subjected to tensile tests according to ASTM D–882 and D–256. These results are also shown in Table 1.

TABLE 1

| | Weight ratio oligomer to hexamethoxymethylmelamine | | | |
|---|---|---|---|---|
| | 90/10 | 80/20 | 70/30 | 60/40 |
| Oligomer, g | 12.00 | 10.67 | 9.33 | 8.00 |
| Hexamethoxymethylmelamine | 1.00 | 2.00 | 3.00 | 4.00 |
| Toluene | 2.38 | 2.71 | 3.05 | 3.38 |
| 25% p-toluenesulfonic acid, cc | 0.10 | 0.10 | 0.10 | 0.10 |
| Gardner impact strength, in.-lb | >160 | >160 | 50 | 20 |
| Tensile strength, p.s.i | | 6,700 | | 4,800 |
| Tensile modulus, p.s.i | | 280,000 | | 230,000 |
| Elongation, percent | | 4.55 | | 15 |
| Impact strength, ft. lb./in.³ | | 34 | | 35 |

EXAMPLE 3

Diisocyanate cured oligomer

The hydroxyl terminated oligomer described in Example 1 was dissolved in dry toluene to afford a solution containing 70% solids. Five 5.54 g. samples of this 70% solution were each admixed with one of the five diisocyanates:

1.00 g. of bis(2-isocyanatoethyl)carbonate (CDI)
1.27 g. of bis(2-isocyanatoethyl)furmarate (FDI)
1.60 g. of bis(2-isocyanatoethyl)-5-norborene-2,3-dicarboxylate (CEDI).
1.54 g. of bis(2-isocyanatoethyl)-4-cyclohexane-1,2-dicarboxylate (CEDI).
0.87 g. of 2,4-tolylenediisocyanate (TDI)

These mixtures were cast on glass and bonderized steel and cured for one hour at 150° C. All of the cured films possessed good mar resistance and outstanding toughness as evidenced by Gardner Impact strengths both normal and reverse (i.e., convex and concave) in excess of 160 inch-pounds even at film thickness as great as 3 mils.

For air-dried cured films a dibutyl tin dilaurate catalyst (0.1% by weight) added as a 1% solution in toluene was effective with all five of the above systems affording tack-free films in 3 hours and hard enough to sand in 24 hours. Baking can also be used with catalyzed systems. A baked film made from CDI cured oligomer (Example 3) catalyzed with 0.1% dibutyl tin dilaurate displayed the following physical properties:

Tensile strength, p.s.i.—2,500
Tensile modulus, p.s.i.—20,000
Elongation, percent—220
Impact strength, ft. lbs./in.³—65
Glass transition temperature, °C.—30
Modulus at 10,000 p.s.i.—30
Modulus at 1,000 p.s.i.—35
Modulus at 100 p.s.i.—120

EXAMPLE 8

Example 1 was repeated with the exception that pentaerythritol was substituted for the trimethylol propane and the stoichiometry of the charge was 1/8/9 neopentyl glycol/pentaerythritol/diphenyl carbonate. The resultant hydroxyl terminated oligomer was a waxy solid having an hydroxyl equivalent of 2.46 milliequivalents of hydroxyl per gram and was almost indistinguishable from the oligomer of Example 1.

EXAMPLES 9–14

When the hydroxyl terminated oligomer prepared as described in Example 8 was cured with hexamethoxymethylmelamine as described in Example 2 and with the diisocyanates described in Examples 3–7, cured oligomers having similar physical properties were obtained.

EXAMPLES 15–20

Hydroxyl terminated oligomers cured with hexamethylolmelamine and vinyl chloride/vinyl acetate/vinyl alcohol terpolymer The hydroxyl terminated oligomer prepared in Example 1 was blended with hexamethoxymethylmelamine and a vinyl chloride/vinyl acetate/vinyl alcohol 91/3/6 terpolymer (intrinsic viscosity, in cyclohexanone at 30° C., 0.57) in the following ratios of terpolymer/oligomer/hexamethoxymethylmelamine:

72/16/12, 45/40/15 and 18/64/18 in a toluene/methylisobutyl ketone solvent at 25–42% solids content. A 0.25% p-toluenesulfonic acid catalyst was added and films cast on glass and bonderized steel panels. The films were cured by baking one series at 100° C. for 2 hours and another series at 125° C. for 1 hour. In all cases very hard, mar resistant, methylisobutyl ketone insoluble films were obtained.

EXAMPLES 21–29

Preparation of hydroxyl terminated oligomers with compositional variations

Hydroxyl terminated oligomers with higher and lower hydroxyl contents and functionalities than that prepared in Example 1 were prepared from trimethylol propane (TMP), neopentyl glycol (NPG), and diphenyl carbonate (DPC). Pertinent data are presented in Table 2 together with that from Example 1. The procedure used was that of Example 1 except that a 1-liter flask was used as the reactor.

Films of these products cured with hexamethoxymethylmelamine (0.25% p-toluenesulfonic acid catalyst at 150° C. for 45 minutes were also prepared). These also showed practical hardness properties which would allow their use as protective coatings although they differed from the product described in Example 2 in that Example 22 cured to a harder product while Examples 21 and 23 were somewhat softer.

Films of the products of Examples 21, 22 and 23 were also cured with bis(2-isocyanatoethyl)carbonate (10% excess over the calculated stoichiometric ratio) and 0.10% dibutyl tin dilaurate as catalyst. The properties of the cured films were similar to those described in Examples 3–7.

TABLE 2.—OLIGOMERS OF DIFFERENT HYDROXYL CONTENT AND OF DIFFERENT HYDROXYL FUNCTIONALITY

| Example number | 21 | 22 | 23 | 1 |
|---|---|---|---|---|
| Trimethylolpropane, g | 33.5 | 134.2 | 80.5 | |
| Neopentyl glycol | 234.3 | 156.2 | 198.1 | |
| Diphenyl carbonate | 482.0 | 482.0 | 449.8 | |
| LiOH.H₂O | 0.004 | 0.004 | 0.004 | |
| Product yield, g | 313.7 | 332.0 | 314.5 | |
| Product appearance | (¹) | (²) | (¹) | (¹) |
| Material balance, percent | 100.0 | 99.6 | 99.6 | >99.5 |
| Hydroxyl content, meq./g | 1.54 | 4.12 | 3.50 | 2.58 |
| Hydroxy Func | 4.0 | 7.0 | 4.4 | 4.86 |
| TMP/NPG/DPC ratio | 1/8.5/9 | 4/5.8/9 | 2/5.8/7 | 2/7.7/9 |
| Molecular weight | 731 | 1,289 | 336 | Ca. 1,500 |

¹ Waxy solid.  ² Tacky solid.

EXAMPLES 30–40

Oligomers based on other raw materials

A number of substitutions of raw materials for those of the Example 1 formulation were made. These experiments are summarized in Table 3. Several diols which did not possess the neopentylene structure gave coatings of commercial interest when cured with hexamethoxymethylmelamine or with a diisocyanate although they did not possess comparable toughness.

Some diols having the neopentylene structure show much of the unique performance of the Example 1 formulation. These included the next higher homolog of NPG, 2-methyl-3-ethyl-propanediol-1,3 and "Ester-Diol" which has the structure:

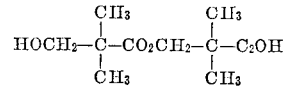

TABLE 3.—RAW MATERIAL VARIATIONS ON EXAMPLE 1 FORMULATION

| Exp. No. | Replacement chemical | Mole ratio [1] | Appearance | OH value | Coating characteristics on curing |
|---|---|---|---|---|---|
| Replacements for neopentyl glycol: | | | | | |
| 30 | Dipropylene glycol | 2/8/9 | Visc. liquid | 2.52 | ⎫ |
| 31 | Pentanediol-1,5 | 2/8/9 | do | 3.09 | ⎬ All of these oligomers can be cured to hard coatings. |
| 32 | Ethylene glycol | 2/8/9 | Fluid liquid | 3.14 | ⎭ |
| 33 | Ester-diol 204 | 2/3.7/5 | Visc. liquid | 2.96 | ⎫ Have much of the cure behavior of Example 1 formulation. |
| 34 | do | 2/4.4/5.7 | do | 2.52 | ⎭ |
| 35 | 2-methyl-2-ethylpropanediol-1,3 | 2/8/9 | do | 2.14 | ⎫ |
| 36 | 1,4-cyclohexanedimethanol | 2/8/9 | do | 2.67 | ⎬ Do. |
| 37 | 2,2,4-trimethylpentandiol-1,3 | 2/8/9 | Thin liquid | 2.19 | Does not cure well with hexamethoxymethylmelamine but acts as though it decomposes. |
| 38 | 2-ethyl-2-nitropropanediol-1,3 | 2/8/9 | | | Nitro compound decomposed during preparation |
| Replacements for trimethylolpropane: | | | | | |
| 39 | Pentaerythritol | 1/8/9 | Waxy solid | 2.46 | Cures like Example 1 formulation. |
| 40 | Hexanetriol-1,2,6 | 2/8/9 | Liquid | 2.08 | Low viscosity liquid does not cure well with hexamethoxymethylmelamine. |

[1] Mole ratio of polyol/diol/diphenylcarbonate charged; product ratio may be slightly different.

Pentaerythritol gave a product which appeared to be indistinguishable from the Example 1 product. Hexanetriol-1,2,6, an isomer of TMP, gave an abnormal product, a low viscosity liquid which did not cure well.

EXAMPLES 41–42

Carbonate oligomers of TMP/"Ester-Diol"

Table 4 shows two oligomers based on the "Ester-Diol" depicted in Examples 30–40, one a molar substitution variation on Example 1, and the other adjusted to obtain the hydroxyl content of Example 1 as well as its hydroxyl functionality. Both products were made in three-necked flasks equipped with magnetic agitation, thermometer, and a Vigreux column surmounted with a distillation head permitting reflux control, condenser, receiver, etc. Initial distillation of by-product phenol was at 100 mm. absolute pressure; toward the end the pressure was reduced to about 25 mm. When the theoretical quantity of phenol had been collected, the distillation of volatiles simply ceased; apparently there is little, if any, tendency, even in the presence of a modest amount of hydroxyl, for ester exchange reactions leading to the generation of neopentyl glycol.

TABLE 4.—CARBONATE OLIGOMERS OF TRIMETHYLOL PROPANE AND "ESTER-DIOL"

| Example | 41 | 42 |
|---|---|---|
| Molar ratio TMP/E-D 204/DPG | 2/3.7/5 | 2/4.4/5.7 |
| Trimethylolpropane, g | 188 | 268 |
| Ester-diol 204 | 529 | 898 |
| Diphenyl carbonate | 750 | 1,220 |
| LiOH·H₂O | 0.008 | 0.012 |
| Reaction temperature °C | 165–200 | 171–204 |
| Reaction time hrs | 4.5 | 4.5 |
| Distillate yield (theory) g | 658 (659) | [1] 1,084 (1,061) |
| Product yield (theory) | 804 (808) | 1,296 (1,325) |
| Material balance percent | 99.6 | 99.7 |
| Appearance | [2] | [2] |
| Hydroxyl content (theory) meq./g | 2.76 (2.95) | 2.52 (2.57) |
| Hydroxyl functionality | 4.86 | 4.86 |
| Molecular weight (theory) | 1,283 (1,965) | ---- (1,970) |

[1] The high distillate yield was the result of some flooding in the initial stage of the phenol distillation.
[2] Pale balsam.

Both of the "Ester-Diol" oligomers were very viscous liquids rather than waxy solids like the Example 1 product. Both gave very low viscosity solutions in toluene at 50% solids and do not crystallize out of solution. Both resins cured with either hexamethoxymethylmelamine or CDI to give clear films which were much like those of Example 1.

EXAMPLES 43–49

Polyester oligomer preparations

In a further study of coatings resins based on the "Ester-Diol" this diol was esterified with various cyclic dibasic acids and a minor amount of trimethylol propane to yield branched, hydroxyl-terminated, low molecular weight polyesters. The cyclic acids used included phthalic, isophthalic, tetrahydrophthalic and hexahydrophthalic. In addition, a few experiments were made with propylene glycol and neopentyl glycol in place of "Ester-Diol." Curing these polyesters with a melamine resin or with a diisocyanate gave some very attractive coatings.

The several polyesters made for curing with diisocyanates or with hexamethoxymethylmelamine are summarized in Table 5. To make comparisons more meaningful each of the polyester formulations was designed so that the average polyester molecule would contain 4.9 terminal hydroxyls at a standardized weight per hydroxyl of 400 grams (that is, a hydroxyl concentration of 2.50 meq./g.). With the exception of propylene glycol, which is somewhat volatile (and difficult to compensate for losses), the several polyesters of Table 5 met this requirement.

Each of the polyesters of Table 5 was made by an azeotropic distillation technique, the weights of reactants shown being for a 2-liter flask. Enough xylene was added to obtain a good reflux rate at about 200° C., byproduct water being removed and xylene returned via a Dean-Stark trap. Because it was convenient to do so, each batch was held overnight at reflux to obtain a low acid value product. The polyester was then reduced to 75% nonvolatile with toluene.

TABLE 5.—PREPARATION AND PROPERTIES OF HYDROXYL-TERMINATED POLYESTERS

| Exp. No. | Diacid used | Diol used | TMP, g. | Diol, g. | Acid, g. | Molar ratio [1] | Acidity [2] | Hydroxyl [2] | Viscosity [3] | Color [3] |
|---|---|---|---|---|---|---|---|---|---|---|
| 43 | Phthalic | Ester-diol | 268 | 552 | 592 | 2/2.7/4 | 0.09 | 2.43 | Z3–Z4 | 3 |
| 44 | Isophthalic | do | 268 | 552 | 592 | 2/2.7/4 | 0.20 | 2.53 | Z6–Z7 | 4 |
|  |  |  | 268 | 552 | 592 | 2/2.7/4 | 0.16 | 2.50 | Z6 | 4–5 |
| 45 | Tetrahydrophthalic | do | 268 | 552 | 609 | 2/2.7/4 | 0.14 | 2.63 | Z1–Z2 | 1 |
| 46 | Hexahydrophthalic | do | 268 | 552 | 617 | 2/2.7/4 | 0.16 | 2.50 | Z3 | 1 |
| 47 | Phthalic | Propylene glycol | 268 | 368 | 889 | 2/4.7/6 | 0.03 | 2.27 | >Z7 | 2–3 |
| 48 | Tetrahydrophthalic | do | 268 | 321 | 821 | 2/4.1/5.4 | 0.14 | 2.8 | ---- | 1 |
| 49 | do | Neopentyl glycol | 268 | 385 | 761 | 2/3.7/5 | 0.15 | 2.49 | Z4 | 1 |

[1] Trimethylolpropane/diol/diacid.
[2] Both acidity and hydroxyl values are in units of milliequivalents/gram solids basis; to convert to mg. KOH/g., multiply by 56.1.
[3] Both viscosity and color are in Gardner units, measured at 75% solids (toluene).

EXAMPLES 50-56

Melamine-cured polyester oligomer coatings

The polyester oligomers described in Examples 43-49 were cured at an oligomer/hexamethoxymethylmelamine ratio of about 80/20 by weight, using p-toluenesulfonic acid, 0.25% by weight based on total solids, as the curing catalyst:

| | |
|---|---|
| 75% polyester solution _____ g__ | 10.67 |
| "Cymel" 300 _____ | 2.00 |
| Toluene _____ | 2.73 |
| 25% p-toluenesulfonic acid in n-butanol ____ cc__ | 0.10 |

These solutions had a moderately low viscosity (not measured) and handled nicely when used with a doctor blade to cast films on glass or metal. On curing 45 minutes at 150° C., they were converted to very hard, very mar resistant, MEK-insoluble coatings; on bonderized steel these passed a 40 inch-pound impact. Differences among the several polyester films were slight.

EXAMPLES 57-63

Diisocyanate-cured coatings

A calculated 10% excess of diisocyanate was used to cure each of the Example 43-49 hydroxyl-terminated polyesters, for example:

| | |
|---|---|
| 75% (TMP/Ester-Diol/Tetrahydrophthalic acid) _____ g__ | 5.08 |
| CDI _____ | 1.10 |
| Toluene _____ | 3.84 |
| 1% Dibutyl tin dilaurate in toluene _____ cc__ | 0.50 |

Each was reduced to 50% nonvolatile in dry toluene and the tin catalyst (0.10% by weight) added just before using the solution. The working time was about an hour at room temperature.

Air-dried films were dry to touch in about 2 hours. At 24 hours, the air-dried films had a rather good degree of through-cure and a modestly good surface hardness; such films on bonderized steel have passed a 120 inch-pound impact. The same level of cure can also be realized wtih an hour bake at 100° C.

EXAMPLES 64-65

Samples of hydroxyl terminated polyester oligomer prepared in Example 1 and of the oligomer cured with hexamethoxymethylmelamine and bis(2-isocyanatoethyl) carbonate were subjected to ultraviolet absorption analysis. The oligomer was found to be essentially transparent in the near ultraviolet with slight absorption at 230, 272, 278 and 288 millimicrons due to traces of phenol introduced in its preparation. The oligomer cured with bis(2-isocyanatoethyl)carbonate was essentially transparent in the near ultraviolet. The hexamethoxymethylmelamine resin absorbed strongly below 300 mμ but not above.

Although this invention has been described in its preferred forms with a certain degree of particularity, it is understood that the present disclosure of the preferred forms has been made only by way of example, and that numerous changes may be resorted to without departing from the spirit and scope of the invention.

What is claimed is:

1. A cured hydroxyl terminated oligomer obtained by heating a mixture of:
   (a) 1 mole of a polyol selected from the group consisting of 1,1,1-trimethylolpropane and pentaerythritol;
   (b) 1.35 to 2.2 moles of ester-diol having the formula:

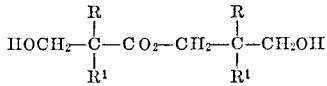

wherein each of R and $R^1$ is an alkyl group having up to 4 carbon atoms; and
   (c) 2 to 2.85 moles of an ester-forming compound selected from the group consisting of cyclic dibasic acids and cyclic anhydrides, at a temperature of about 150 to 250° C. for at least 2 hours; said oligomer thereafter being cured by reacting with at least a stoichiometric amount of an organic polyisocyanate in an organic solvent at ambient temperatures, removing solvent, and thereafter air-drying at ambient temperatures to about 100° C. until hard.

2. The cured oligomer claimed in claim 1 wherein the polyisocyanate is a diisocyanate.

3. The cured oligomer claimed in claim 2 wherein the diisocyanate is 2,4-tolylenediisocyanate.

4. The cured oligomer claimed in claim 2 wherein the diisocyanate is bis(2-isocyanatoethyl)carbonate.

5. The cured oligomer claimed in claim 2 wherein the diisocyanate is bis(2-isocyanatoethyl)-4-cyclohexene-1,2-dicarboxylate.

6. The cured oligomer claimed in claim 2 wherein the diisocyanate is bis(isocyanatoethyl)fumarate.

7. The cured oligomer claimed in claim 2 wherein the diisocyanate is bis(2-isocyanatoethyl)-1,4,5,6,7,7 - hexachloro-5-norbornene-2,3-dicarboxylate.

8. The cured oligomer claimed in claim 2 wherein the diisocyanate is methylene bis(4-phenyl isocyanate).

9. The cured oligomer claimed in claim 2 wherein the diisocyanate is bis(2 - isocyanatoethyl)-5-norbornene-2,3-dicarboxylate.

References Cited

UNITED STATES PATENTS

| | | | |
|---|---|---|---|
| 2,970,118 | 1/1961 | Wilson et al. | 260—2.5 |
| 2,981,700 | 4/1961 | Parker et al. | 260—2.5 |
| 2,982,754 | 5/1961 | Sheffer et al. | 260—33.4 |
| 3,015,650 | 1/1962 | Schollenberger | 260—75 |
| 3,055,869 | 9/1962 | Wilson et al. | 260—75 |
| 3,079,350 | 2/1963 | Bernstein | 260—2.5 |
| 3,094,510 | 6/1963 | Parker et al. | 260—75 |
| 3,141,900 | 7/1964 | Lynn et al. | 260—453 |
| 3,158,638 | 11/1964 | Hoch | 260—455 |
| 3,288,730 | 11/1966 | Baltes et al. | 260—2.5 |
| 3,322,812 | 5/1967 | Brotherton et al. | 260—463 |
| 3,352,830 | 11/1967 | Schmitt et al. | 260—77.5 |
| 3,373,143 | 3/1968 | Chilvers et al. | 260—75 |
| 3,248,373 | 4/1966 | Barringer | 260—77.5 |

FOREIGN PATENTS 635,304  11/1963  Belgium.

OTHER REFERENCES

Condensed Chemical Dictionary, 7th edition Reinhold, New York (1966) p. 692.

DONALD E. CZAJA, Primary Examiner

H. S. COCKERAM, Assistant Examiner

U.S. Cl. X.R.

260—67.6, 850